(12) United States Patent
Colopy

(10) Patent No.: US 8,133,430 B2
(45) Date of Patent: Mar. 13, 2012

(54) METHODS FOR FABRICATING POLYCRYSTALLINE SIC ELECTRICAL DEVICES

(75) Inventor: Curtis M. Colopy, New Paltz, NY (US)

(73) Assignee: Surface Igniter LLC, Chagrin Halls, OH (US)

( * ) Notice: Subject to any disclaimer, the term of this patent is extended or adjusted under 35 U.S.C. 154(b) by 0 days.

(21) Appl. No.: 12/850,496

(22) Filed: Aug. 4, 2010

(65) Prior Publication Data

US 2011/0148011 A1 Jun. 23, 2011

(51) Int. Cl.
*B28B 1/26* (2006.01)
(52) U.S. Cl. ..................................... 264/625; 264/682
(58) Field of Classification Search .................. 264/625, 264/682, 630, 631
See application file for complete search history.

(56) References Cited

U.S. PATENT DOCUMENTS

| | | | | |
|---|---|---|---|---|
| 3,875,477 | A * | 4/1975 | Fredriksson et al. | 361/264 |
| 4,429,003 | A * | 1/1984 | Fredriksson et al. | 428/317.9 |
| 5,972,818 | A * | 10/1999 | Dynan et al. | 501/88 |
| 2002/0010067 | A1* | 1/2002 | Willkens et al. | 501/88 |
| 2004/0079469 | A1* | 4/2004 | Chan et al. | 156/89.11 |
| 2005/0276961 | A1* | 12/2005 | Sherwood et al. | 428/292.1 |

* cited by examiner

*Primary Examiner* — Matthew Daniels
*Assistant Examiner* — Erin Snelting
(74) *Attorney, Agent, or Firm* — Lowe Hauptman Ham & Berner LLP

(57) ABSTRACT

The present invention relates to a novel electrical devices fabricated from polycrystalline silicon carbide (SiC) and methods for forming the same. The present invention provides a method for fabricating polycrystalline silicon carbide (SiC) products infiltrated with SiC-containing preceramic precursor resins to substantially mask the deleterious effects of trace contaminants, typically nitrogen and aluminum, while reducing operative porosity and enhancing manufacturing ease.

2 Claims, 3 Drawing Sheets

Net Carrier Concentration at Solubility Limits in 6H-SiC

METHODS FOR FABRICATING POLYCRYSTALLINE SIC ELECTRICAL DEVICES

CROSS REFERENCE TO RELATED APPLICATIONS

This application claims priority from U.S. Ser. No. 12/092,801 filed May 6, 2008, which in turn claims priority to PCT App. Ser. No. PCT/US06/60634 filed Nov. 7, 2007, which in turn claims priority from U.S. Prov. App. No. 60/734,127 filed Nov. 7, 2005, the entire contents of each of which are herein incorporated by reference.

BACKGROUND OF THE INVENTION

1. Field of the Invention

The present invention relates to novel electrical devices fabricated from polycrystalline silicon carbide (SiC) and methods for forming the same. More specifically, the present invention provides a method for fabricating polycrystalline silicon carbide (SiC) products infiltrated with SiC-containing preceramic precursor resins to substantially mask the deleterious effects of trace contaminants, typically nitrogen and aluminum, while reducing operative porosity and enhancing manufacturing ease.

2. Description of the Related Art

Prior to the advent of electric ignition controls, gas appliances and equipment were manually lit with a match or had continuously burning pilot lights. Although a few appliances still use these methods, the vast majority employ some form of spark or hot surface ignition.

Spark ignition systems are conventionally known to make use of an electronic control and an electrode located near a metal burner port that is electrically grounded. In operation, when there is a call for heat by a controlling thermostat or other means, a control opens a gas-supply valve and simultaneously provides a high voltage discharge (typically 20 kilovolts) to the electrode, which then "sparks" to the burner. This spark, in the presence of gas, ignites the burner.

In contrast to conventional spark systems, the controls used with SiC-based hot surface ignition operate differently. In operating a hot surface ignition system, when there is a call for heat, electrical power is applied to the igniter. Thereafter, after the igniter is allowed time to reach an operational temperature hot enough for ignition, a gas-supply valve is opened.

It should be noted that both types of ignition systems described (spark ignition and hot surface ignition) have safety features, which prevent continued gas flow in the absence of flame.

In 1988, minimum efficiency standards for most major gas appliances were instituted by the U.S. Department of Energy. These standards largely led to the demise of the standing pilot light for many appliance types and greatly increased the market potential for gas igniters. The positive market effect for SiC hot surface ignition surpassed that of electronic spark ignition based on a number of factors, including:

e. A recognition that the physical position of a poorly adjusted spark igniter electrode can shift, thereby reducing the spark's ability to light the burner. In contrast, due to its relatively large thermal mass within the gas-stream the hot surface igniter is much less position sensitive than a spark electrode and thus provides a more reliable source of ignition.

f. A recognition that the high voltage discharge inherent to spark systems can cause interference within the electromagnetic spectrum, specifically radio frequency interference in nearby electronic devices such as radios, TV's, computers, etc.

g. A recognition that the metal alloys used for spark electrodes erode and become pitted with use, reducing their effectiveness. In contrast the SiC materials used in conventional hot surface igniters withstands much higher temperatures than metal alloys.

h. A recognition that in most applications, a total system cost of using a SiC hot surface igniter is less than a comparable spark ignition system.

These types of hot surface SiC igniters may have various physical shapes, for example, the SiC hot surface igniter shown in U.S. Pat. No. 3,875,477 to Fredriksson, et al., the contents of which are incorporated herein by reference. As referred to hereafter, the igniter noted in Fredriksson shall be understood to represent a thin-profile igniter having a first wide cross-section parallel to the plane shown in FIG. 1 in U.S. Pat. No. 3,875,477 and a second narrow cross-section perpendicular to the first cross-section.

As shown, this type of hot surface igniter provides a serpentine-form of electrical connection from two pole ends. A central region between the pole ends, having a reduced cross-section, is more resistive to electrical conduction, heats rapidly to allow hot surface ignition. While the present discussion, and methods and apparatus discussed, must be recognized to have broader application throughout the industry, this example form aids the general understanding without limiting the present application in any way to the form noted.

Yet despite the recognition provided to SiC hot surface igniters, certain detriments remain. It is now recognized that the density of the SiC hot surface igniter is critical in determining its electrical stability and mechanical strength. These factors (electrical stability and mechanical strength) are the two most important factors in the user-perceived quality and operating life of the igniter. Unfortunately, despite the above-recognition, in existing SiC igniter product examples, a typical 84% to 86% SiC density corresponds to a relatively high 16% to 14% interspermosing (meaning operable or flow-able interstecies between particles) porosity which is easily permeated by air and moisture, much like an open cell foam structure. Such detrimental porosity leads directly to excessive material oxidation at operational temperatures, mechanical stress, electrical property "aging" and resultant premature failure of the product.

Recently, in attempts to overcome the now-recognized detriments of SiC hot surface igniters several new types of ceramic hot surface igniters have emerged. These products (these grouped together and referred to as "nitride" igniters herein) are superior in mechanical strength but cannot match the service longevity and functional robustness of conventional SiC igniters. Specifically, nitride ceramics are limited in their detrimental high temperature capability in oxidizing environments as compared to silicon carbide (SiC) igniters.

SUMMARY OF THE INVENTION

A method is provided for forming polymer-ceramic composite igniter shapes that are pyrolyzed in supporting fixtures at temperatures as low as 650° C. in nitrogen or other inert gas atmospheres. This pyrolyzing step converts the impregnated resin content to 70% to 80% silicon carbide by weight enabling a permanent SiC bonding phase at temperatures as low as 650° C., thereby creating a self supporting structure within an operational temperature ranges of 650° C. and approximately 2000° C., allowing substantially self-supporting/support-free firing orientations during downstream recrystallization and resultant production efficiencies.

The resulting material is a ceramic-bonded particulate ceramic composite that will later be recrystallized to attain desired electrical and mechanical properties. The balance of the resin content (30% to 20% by weight) is volatilized as hydrogen, hydrocarbon and pyrophoric silane waste gases. The supporting fixtures serve to limit dimensional distortion of the individual igniter shapes during the conversion reaction.

As a consequence of the above method, the bonding phase formed from the resin is amorphous (non-crystalline) SiC typically comprising up to 10% by weight of the composite material. The original particulate matrix formed during slip casting comprises the balance, which is alpha phase SiC with a hexagonal crystal structure and/or beta phase SiC with a cubic crystal structure.

The proposed method, including but not limited to steps of impregnation, curing and conversion processes differ significantly from that taught in U.S. Pat. Nos. 3,875,477, 6,297,183 and 6,562,745.

In summary, this invention provides an improved electrical SiC method and product, where the example product (the silicon carbide igniter above described) is of superior quality in terms of material properties (reflected in for example material density, consistency, electrical stability, mechanical strength, mechanical toughness and durability), improved operational life (in terms of durational time to failure), and other benefits.

The present invention will also result in substantial improvements to correspondingly processing time and manufacturing costs, firing energy, and product field replacement and quality control costs.

It is also proposed that the present product and process invention is applicable to other SiC electrical components, for example, SiC heating elements and SiC infrared radiation devices.

The present invention relates to an improved method for production of silicon carbide igniter bodies exhibiting a permanent SiC bonding phase at temperatures as low as 650° C. resulting in an uncommon degree of structural strength for a ceramic bisque product.

The above discussion and other features and advantages of the present invention will become apparent from the following description read in conduction with the accompanying drawings, in which like reference numerals designate the same elements.

DETAILED DESCRIPTION OF THE PREFERRED EMBODIMENTS

Reference will now be made in detail to the discussion supported by the accompanying illustrations. These drawings are in simplified form and are not to precise scale but are operative for assisting an understanding of the method herein. For purposes of convenience and clarity only, directional terms, such as top, bottom, up, down, over, above, and below may be used with respect to the drawings. These and similar directional terms should not be construed to limit the scope of the invention in any manner.

This invention relates to novel electrical devices, including the hot surface igniters discussed above, fabricated from polycrystalline silicon carbide (SiC) and methods for forming the same. However, it shall be recognized that as used herein a hot surface igniter is merely a representative example wherein the heating element portion is composed of silicon carbide, that the present invention is not limited thereto and has broader applications throughout the industry.

In contrast to the limited densities noted above, with the present invention, the product igniter formulation decreases deterioration substantially by further reducing the porosity to 12% to 10% (a substantive and material improvement of 25%-40%) where the individual pores become more isolated and substantially closed from a micro-structural viewpoint. This at least 25% decrease in porosity (density improvement), and the resultant substantial closing of all pore reduces atmospheric infiltration and extends service life up to three-fold (300% improvement) over conventional igniters (See Table 1). Additionally, a substantial increase in mechanical strength is also achieved by virtue of both smaller pore sizes and higher density. To the product consumer these improvements mean reduced breakage during appliance transportation and use, and a significant decrease in the total cost of appliance ownership.

TABLE 1

|  | Summary of conventional specimens tested | Trial 1 - summary |
| --- | --- | --- |
| Theoretical porosity | 14% | 11.5% |
| Mean time to failure (Operational cycles, 2 min on/off) | 125,000 cycles | 155,000 cycles |
| Operational Temperature (° C.) | 1500 | 1500 |
| Number Tested | 10 | 8 |

\* - Conventional Specimens provided by Norton module no. 101

Figure 1:
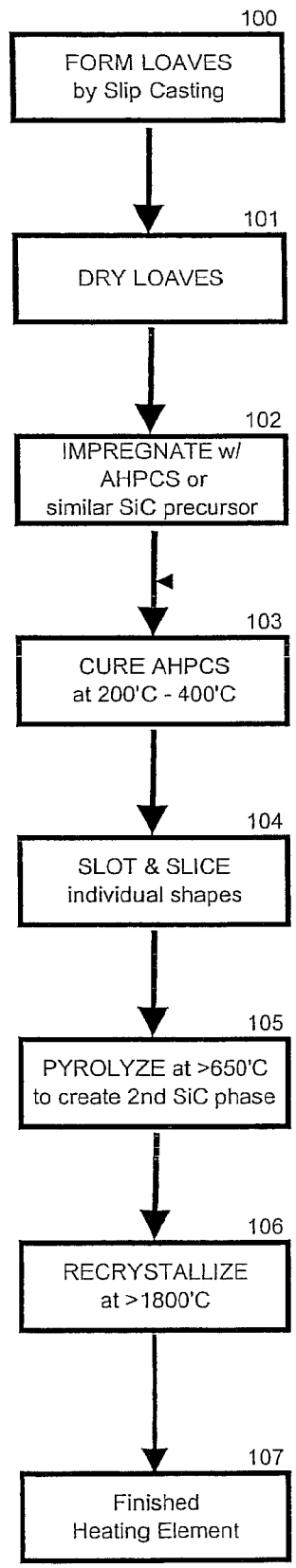
FIG. 1 is a flow diagram of the proposed method without recycling.
Figure 2:
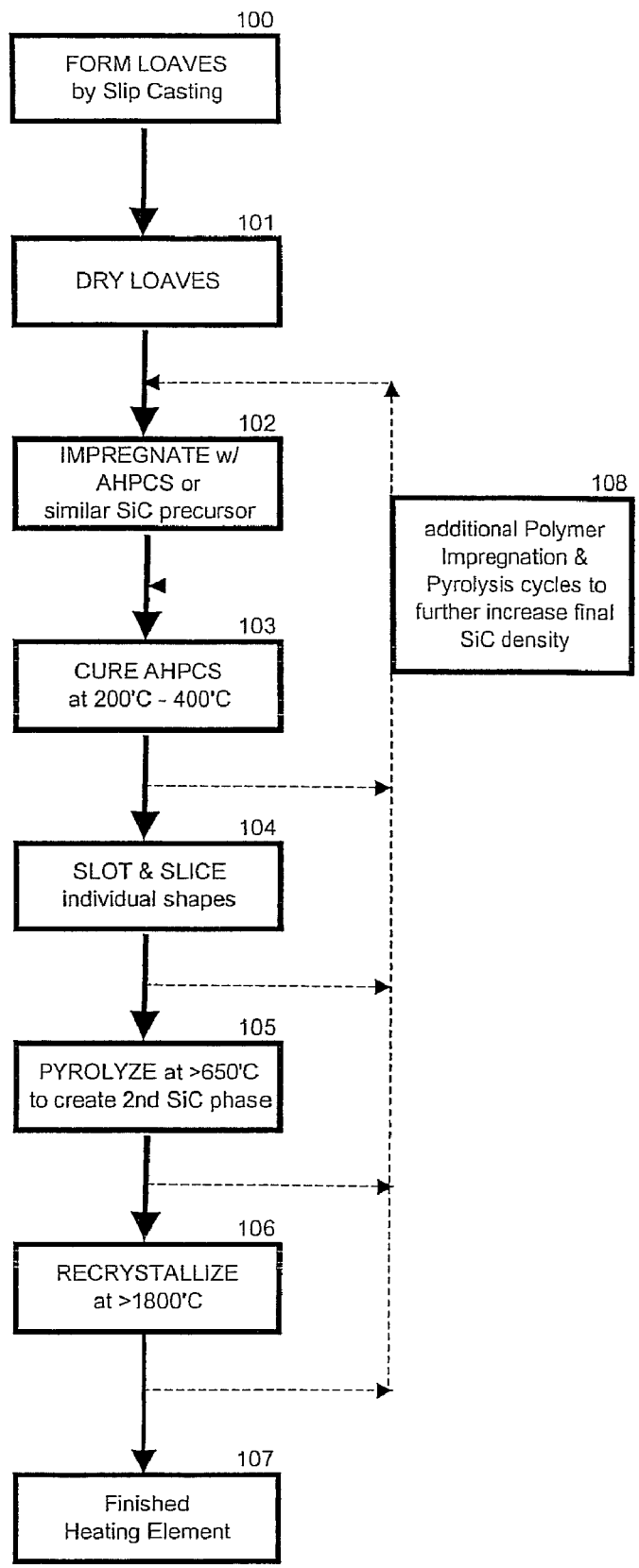
FIG. 2 is a process flow diagram of the proposed method including a secondary densifying step.

Referring now to FIGS. 1 and 2, the proposed invention for creating a ceramic body creates a higher density igniter material by starting with a conventional slip casting process step 100 based on precise selection of the SiC particle sizes, fluid carrier and deflocculants as is known in the art to form a green body (also alternatively referred to herein as a loaf, green loaf, or precursor loaf).

After the green bodies are dried conventionally in a step 101 to a desired moisture content, the SiC loaves are vacuum-pressure impregnated (or optionally infiltrated) in a step 102 with an organo-metallic resin, principally a SiC-precursor-resin. This SiC resin is preferably allylhydrido-polycarbosilane (AHPCS) and more preferably allylhydrido-polycarbosilane (AHPCS) supplied by Starfire Systems, Malta, N.Y., under the trade name SMP-10 Matrix Polymer. Optional or alternative resins include polyborosiloxane and polysilazane, although these are non-preferred.

These types of SiC resins are represented, for example by the following chemical formula (I):

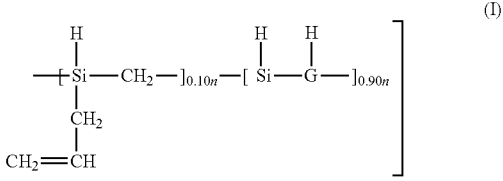

$$\left[ -\!\!\left[ \underset{\underset{CH_2=CH}{|}}{\underset{|}{Si}} -CH_2 - \right]_{0.10n} -\left[ \underset{|}{\overset{H}{Si}} - \overset{H}{G} - \right]_{0.90n} \right] \quad (I)$$

Following vacuum-impregnation the bodies are heated in a curing step 103 to a peak temperature of between 200° C. to 450° C., and more preferably 250° C. to 400° C. in a nitrogen or another inert gas atmosphere to complete curing and cross-linking in a single step.

Next, the green loaves are machined in a step 104 to a desired geometry. As used in the present example here, the loaves are sliced and slotted into a manufacturer-selected individual igniter shape, for example but not limited to the igniter shape noted in U.S. Pat. No. 3,875,477.

The polymer-ceramic composite igniter shapes are then pyrolized in a pyrolyzing step 105 in supporting fixtures at temperatures as low as 650° C. in nitrogen or another inert gas (Argon for example) atmosphere. This pyrolizing step 105 converts the impregnated resin content to 70% to 80% silicon carbide by weight. The resulting material is therefore a ceramic-bonded particulate ceramic composite that will later be recrystallized to attain desired electrical and mechanical properties. The balance of the resin content (30% to 20% by weight) is volatilized as hydrogen, hydrocarbon and pyrophoric silane waste gases. The supporting fixtures serve at this stage only to limit dimensional distortion of the individual igniter shapes during the conversion reaction in step 105.

As a consequence of the above method, the bonding phase formed in step 105 from the resin is amorphous (non-crystalline) SiC typically comprising up to 10% by weight of the composite material. The original particulate matrix formed during slip casting comprises the balance which is alpha phase SiC with a hexagonal crystal structure and/or beta phase SiC with a cubic crystal structure.

As shall be recognized by those of skill in the art, that the proposed method, including but not limited to steps of impregnation, curing and conversion (pyrolyze) processes differ significantly from that taught in U.S. Pat. Nos. 3,875, 477, 6,297,183 and 6,562,745.

In the proposed invention the use of a Si-resin, the preferred suggested AHPCS resin, or the particularly preferred composition noted above, is recognized as now forming a permanent SiC bonding structure at a relatively low processing temperature in contrast to the conventional art that employs a temporary, organic adhesive bond that exists only while the green loaf is sliced and slotted to form the individual igniters and converts only at very high temperatures prohibiting the generation of a self-supporting (actually bonded) structure prior to very-high temperature recrystallization in a step 107. As a consequence, while the conventional art employs a non-structural organic adhesive bond that readily slumps and requires support between the proposed pyrolysis temp, herein as low as 650° C., up to and including a recrystallization temperature (as high as approximately 2000° C. in conventional atmospheres), the present invention provides for a method that enables a permanently bonded SiC structure that self-supports between the pyrolysis temperature and recrystallization temperature.

As noted, in a final step proposed by the present invention, an additional cycle step 108 (FIG. 2) may be provided on a repeated basis to further augment density. As a consequence, while the present method provides a theoretical density of approximately 95% following a first cycle through steps 102 to 105; each succeeding cycle step 108 will result in increasing density until all the pores are closed or rendered unavailable by narrowing to such an extent that the surface tension of the resin may not be over come by hydraulic assistance and pore entry is prohibited.

The proposed method is also in clear contrast to the conventional suggestion to impregnate a green body with slurry composed of very fine silicon carbide particles (<5 microns). The proposed method results in a permanent bond structure that correspondingly facilitates several novel and unexpected derivative results, including strength within a temperature range from 650° C.-2000° C. that are very useful in the further processing of a pre-recrystallized body (here represented by the example igniter product). These results are noted below.

Firstly, the use of AHPCS resin impregnation creates a supplemental density providing more flexibility in the slip casting formation of the original SiC particulate loaf resulting in substantially improved handling and processing capacity. For equivalent final product density, casting parameters such as the SiC slip inter-particle spacing, packing modulus, surface area and colloidal content may be manipulated in manners known in the art, but now with reduced constraint allowing a system to achieve lower slip viscosities, reduced air bubble entrapment and greatly reduced shrinkage (a problem particularly noted in U.S. Pat. No. 6,692,597). Properly balanced, this additional flexibility facilitates a better ordered deposition of the slip cast particles resulting in a corresponding reduction in micro-structural defects in the loaf.

Secondly, SiC-precursor resin impregnation provides a convenient route for homogeneous dispersion of aluminum dopant compounds (operating as a defect originator causing electrical conductivity variation when uncontrolled) throughout the loaf material. At least three variants of the allylhydrido-polycarbosilane (AHPCS) polymer resin (preferably SMP-10 Matrix Polymer resin) may be customized to accomplish and tailor these results, including: 1) a variant suspension formed by adding very fine alumina or aluminum particles in the liquid resin prior to impregnation (Variant No. 1); 2) an admixture suspension of a compatible organo-aluminum compound with the resin (for example the use of an alumina precursor in combination with SMP-10) (Variant No. 2); and 3) an incorporation of aluminum compounds onto the backbone of the resin polymer itself (doping a resin polymer with alumina carrying organo-compositions) (Variant No. 3).

In examining the resultants discussed below, it was specifically noted that the low conversion temperature of the SiC-precursor resin provides an effective means of capturing (prohibiting loss as a gas) elemental aluminum (Al) (given its low melting temperature of 660° C.) in the solid SiC matrix before it can be substantially vaporized. It is notable that these methods may be combined in various ways to achieve and improve the desired electrical and mechanical attributes of the SiC product.

Thirdly, in contrast to the conventional teachings noted above, the method of the present invention provides for the formation of a permanent SiC bonding phase at temperatures as low as 650° C., and hence provides a superior and uncommon degree of structural strength for a bisque product (having for example a strength sufficient to enable high-precision machining to achieve 3-dimensional structures).

The substantially improved strength of the bisque product provides greatly improved versatility in fixturing the product for high temperature (>1800° C.) recrystallization firing. In contrast to conventional firing operations, wherein the green-formed or bisque-fired SiC products are relatively fragile and must be laid directly on horizontal graphite surfaces for support until they have been recrystallized sufficiently to develop adequate mechanical strength to resist plastic or psudo-plastic flow at temperature, the initial bond strength provided by the proposed method enables the amorphous SiC phase (pre-fired) of the individual igniters to be fixtured in a non-horizontal support or non-long-face (free-standing or hanging vertically) position without additional support in a manner that places a first wide cross-section face of an exemplary igniter (as orientationally defined as noted above) substantially along a plane parallel to the direction of gravity without additional support.

As a consequence of this improvement, there is minimal support-contact between a wide cross-section face of an igniters formed according to the present invention and a graphite support surface, whereby convection and radiation heat transfer modes predominate rather than thermal conduction from surface contact.

This unexpected benefit of the proposed method allows recrystallization to occur more homogeneously throughout each igniter's microstructure, and throughout the entire population of igniters being fired concurrently.

The present invention also facilitates an unobstructed environment for more homogeneous gaseous diffusion of aluminum, nitrogen, and other desired semiconductor dopants into the SiC lattice structure. Additionally, the kiln load density, or number of igniter shapes fired together in a given volume, may be substantially increased due to the more efficient vertical setting method. This increases kiln productivity while reducing the energy requirement per unit of product. Further unit energy savings may be obtained using a smaller kiln with proportionately lower heat loss expressly designed around the more efficient vertical setting method.

One proposal of the present invention is a method for manufacturing an impregnated body, comprising the steps of: providing a porous ceramic body having open porosity, impregnating the ceramic body with an organo-metallic resin, curing the impregnated ceramic body at a peak temperature between approximately 200° C. to 450° C. in an inert atmosphere, pyrolyzing the ceramic body at a temperature as low as 650° C. in an inert atmosphere to form a ceramic-bonded particulate ceramic composite bisque product, thereby forming a permanent bonding amorphous phase at temperatures as low as 650° C. enabling an improved process strength, the pyrolyzed ceramic body having a first wide cross-section portion and a second narrow cross-section portion perpendicular to the first cross-section, orienting the pyrolyzed ceramic body in a recrystallization furnace in a first orientation with the first wide cross-section portion parallel to the field of gravity, recrystallizing the ceramic body at a minimum temperature of 1800° C. in an inert gas atmosphere, whereby the amorphous phase enables the recrystallization step without orienting the first wide cross-section portion perpendicular to the field of gravity, and wherein the step of orienting further comprises the steps of: positioning a plurality of the pyrolyzed ceramic bodies in the first orientation whereby respective the first wide cross-section portions contact respective first wide cross-section portions of adjacent pyrolyzed ceramic bodies prior to the step of recrystallizing Finally, the utilization of the SMP-10 Matrix Polymer as an impregnate unexpectedly promotes lower temperature and/or shorter time recrystallization of the SiC structure during high temperature firing (>1800° C.) allowing a faster manufacturing process.

Based upon the above, it is proposed that the resin-derived amorphous SiC phase, and the continued evolution of remnant hydrogen from the same amorphous SiC, both play a role in accelerating the SiC sublimation-condensation reactions which result in epitaxial growth onto larger crystals present in the ceramic-bonded particulate ceramic composite. Thus, the amorphous SiC is believed to "jump start" or act as a seed for overall nucleation and recrystallization as initial nano-sized crystals are first formed from this phase. The evolving hydrogen gas is believed to chemically etch the SiC particulates removing the potentially blocking surface oxidation thus facilitating (speeding) earlier sublimation-condensation of these micro-sized crystals as well.

In sum, due to the intimate mixture of the amorphous and particulate phases in the composite, both mechanisms occur homogeneously at the nano-structural level without diffusion-driven variabilities. In addition to energy savings, more nitrogen dopant can also be incorporated into the lattice due to its higher solubility in SiC at lower recrystallization temperatures. This result can in turn, eliminate the need for an additional high temperature firing to specifically incorporate more nitrogen dopant as is sometimes practiced in the art.

It is proposed as a method beneficial to the goal reducing the variation of electrical conductivity caused by semiconductor dopants to fully saturate such dopants to their individual solubility limits within the SiC lattice using the steps noted above. This tactic also masks the effect of trace contaminants, typically nitrogen and aluminum, present in commercial grade green SiC powders. Given that the solubility of elemental aluminum (Al) in SiC increases with temperature while nitrogen (N) solubility decreases, equivalent-valued solubility limits of about $6^{E20}$ atoms per cubic centimeter (cc) of SiC exist in the region of 1850° C. to 1900° C. Decreasing the SiC recrystallization temperature toward this regime (by employing an additional AHPCS-derived SiC phase according to the proposed method) reduces net carrier concentration and the average contribution of dopants to electrical conductivity.

Moreover, this approach maximizes nitrogen content in the SiC lattice, which substantially decreases the device's response time from room to operating temperature (See Table II). While not wishing to be held to a theory, it is believed that the nitrogen donor carrier creates a positive conductivity temperature coefficient by virtue of its lower ionization energy and higher electron mobility as compared to the aluminum acceptor carrier.

TABLE II

| | Time to Temp (1100° C.) - Min. |
| --- | --- |
| Conventional Igniters+ | 15 seconds maximum. |
| Igniters manufactured by proposed method | 5-10 seconds maximum |

+Summarized composite data testing of igniters by Norton, Model Nos. 101 and 102.

Figure 3:
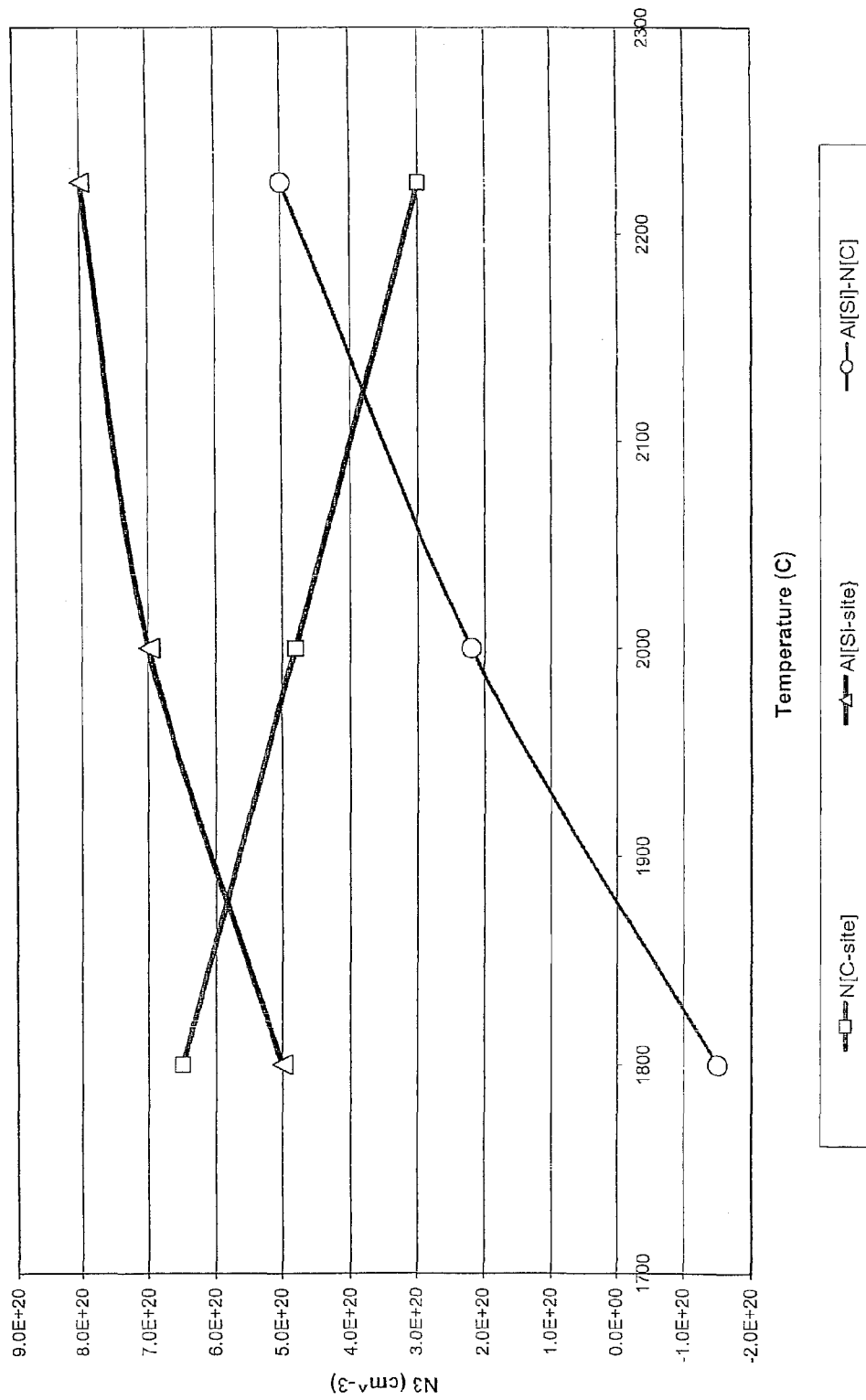
FIG. 3 is a graphical representation of a net carrier concentration of nitrogen and aluminum approaching theoretical limits.

Referring now to FIG. 3, illustrating the data in Table III representing the sum or net solubility of nitrogen at a carbon site in a SiC lattice (N[C-site]), the sum or net solubility of aluminum at a silicon site in the SiC lattice (Al[Si-site]), with the delta of these two dopant solubilitys represented by (Al[Si]-N[C])). This graphical representation is noted against a rising temperature profile to achieve a theoretical optimum solubility limit.

TABLE III

| Temperature °C. | N[C-site] | Al[Si-site] | Al[Si] – N[C] |
|---|---|---|---|
| 2225 | 3.00E+20 | 8.00E+20 | 5.00E+20 |
| 2000 | 4.80E+20 | 7.00E+20 | 2.20E+20 |
| 1800 | 6.50E+20 | 5.00E+20 | −1.50E+20 |

In viewing FIG. 3 it shall be recognized that for a ceramic material manufactured according to the proposed method, at increasing temperatures, for example above roughly 2000° C.-2200° C. (depending upon pressure, gas concentration, and other variables) the resultant SiC ceramic material is saturated by Aluminum and Nitrogen. This saturation correspondingly resulting in a reduced variation of electrical conductivity, masking the effects of such trace contaminants, and with the maximization of nitrogen generating a reduction in response time.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A method for manufacturing an impregnated silicon carbide (SiC) hot surface igniter body from polycrystalline silicon carbide, comprising the steps of:
   forming a slip cast SiC ceramic body;
   drying the slip cast SiC ceramic body to thereby form a porous green body having open porosity;
   vacuum-pressure impregnating said green body with an allylhydridopolycarbosilane (AHPCS) resin;
   curing the impregnated ceramic body at a peak temperature between approximately 250° C. to 450° C. in an inert atmosphere;
   slicing and slotting the cured impregnated body with a manufacturer-selected igniter shape;
   pyrolizing the cured and impregnated ceramic body at a temperature as low as 650° C. in an inert atmosphere to form a ceramic-bonded particulate SiC ceramic composite bisque product, thereby forming a permanent bonding amorphous phase at temperatures as low as 650° C. enabling an improved process strength;
   the pyrolized ceramic body having a first wide cross-section portion and a second narrow cross-section portion perpendicular to the first cross-section;
   orienting said pyrolized ceramic body in a recrystallization furnace in a first orientation with said first wide cross-section portion parallel to the field of gravity;
   recrystallizing said pyrolized ceramic body at a minimum temperature of 1800° C. in an inert gas atmosphere, whereby said amorphous phase enables said recrystallization step without orienting said first wide cross-section portion perpendicular to said field of gravity; and
   wherein said step of orienting further comprises the steps of:
   positioning a plurality of pyrolized ceramic bodies in said first orientation whereby respective said first wide cross-section portions contact respective first wide cross-section portions of adjacent pyrolized ceramic bodies prior to said step of recrystallizing.

2. A process for manufacturing an impregnated silicon carbide (SiC) hot surface igniter body from polycrystalline SiC comprising the steps of:
   forming a slip cast ceramic body comprising SiC particles;
   drying said slip cast SiC ceramic body to form a porous ceramic body having an open porosity and impregnating said porous ceramic body with an allylhydridopolycarbosilane (AHPCS) resin;
   curing the impregnated ceramic body at a peak temperature between approximately 250° C. to 400° C.;
   slicing and slotting the cured impregnated body into a manufacturer-selected igniter
   pyrolizing the cured and impregnated ceramic body at a temperature as low as 650° C. in an inert atmosphere to form a ceramic-bonded particulate ceramic composite body with all the pores rendered unavailable to such an extent that pore entry is prohibited, whereby said step of pyrolyzing forms a permanent amorphous SiC bonding phase at temperatures as low as 650° enabling an improved operational strength within a pre-recrystallization temperature range of between 650° C. and 2000° C.;
   conducting at least one repetition of said steps of impregnating, curing, and pyrolyzing whereby said ceramic body increases in density at each said repetition;
   said AHPCS resin is at least one of a group consisting of: a suspension formed by adding at least one of alumina or aluminum particles in an allylhydrido-polycarbosilane AHPCS resin prior to said step of infiltrating; an admixture suspension of a compatible organo-aluminum compound with a AHPCS resin; and a resin formed by incorporating aluminum compounds onto a backbone of an AHPCS resin polymer itself; and
   recrystallizing the pyrolized ceramic body at a minimum temperature of 1800° C. in an inert gas atmosphere.

* * * * *